Jan. 18, 1944.  K. McCREARY  2,339,479
COMPOSITE GASKET
Filed Dec. 28, 1942
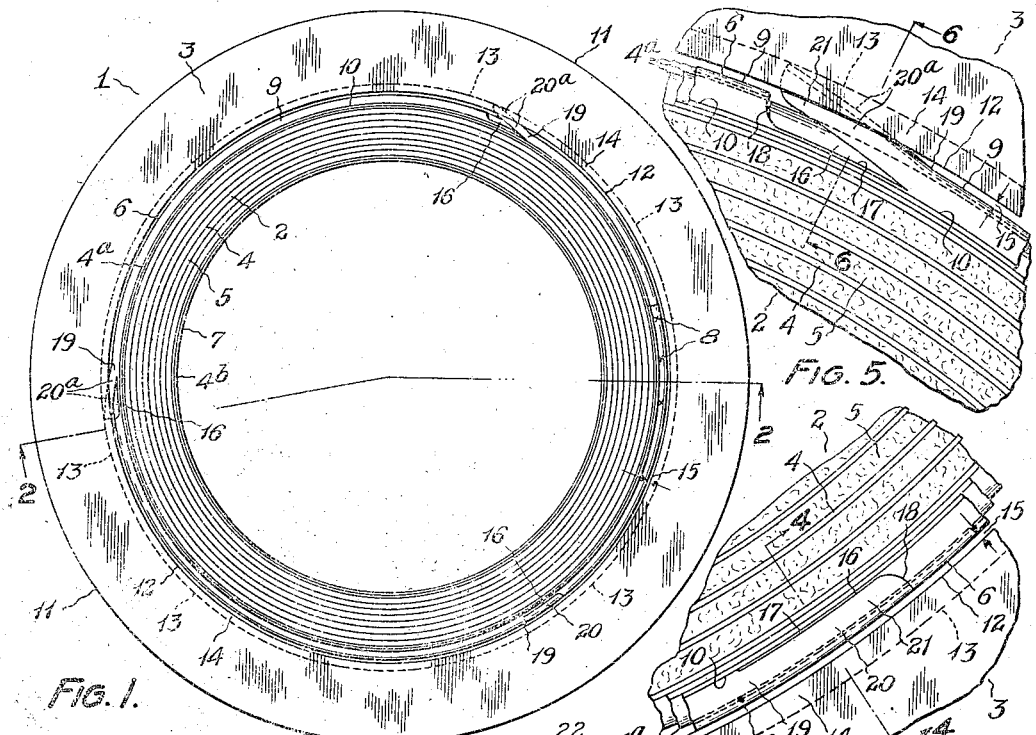
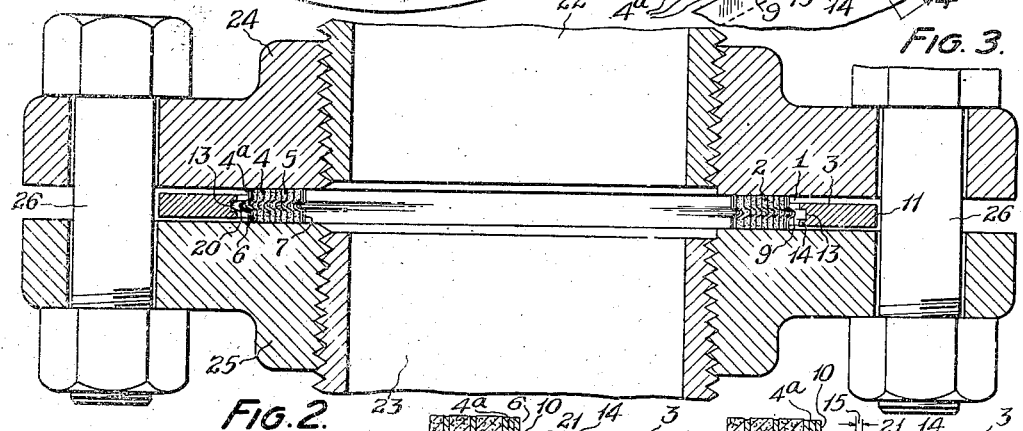
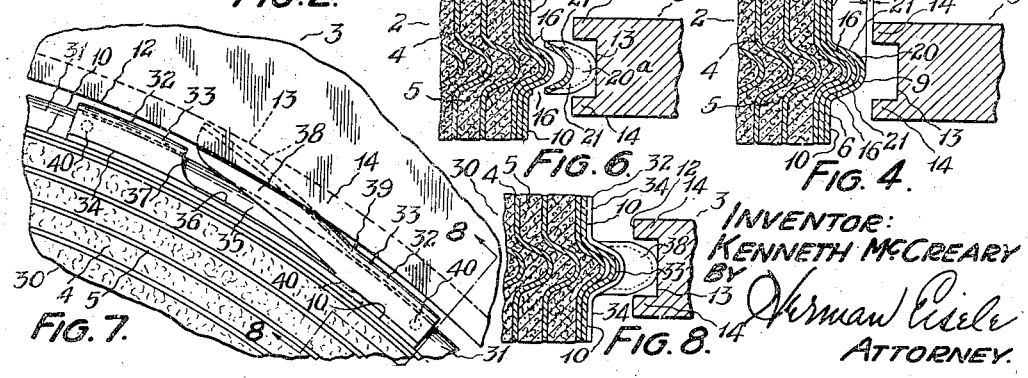
INVENTOR:
KENNETH McCREARY
BY
Norman Eisele
ATTORNEY.

Patented Jan. 18, 1944

2,339,479

UNITED STATES PATENT OFFICE 2,339,479

COMPOSITE GASKET

Kenneth McCreary, Plainfield, N. J., assignor to Frederick W. Goetze, New Brunswick, N. J.

Application December 28, 1942, Serial No. 470,330

10 Claims. (Cl. 288—27)

This invention relates generally to pressure sealing devices intended to be interposed between flanges of pipes or other plane surfaces in pressure piping or in pressure vessels for the purpose of sealing the joint formed by these surfaces against leakage.

More specifically this invention relates to a composite gasket or gasket assembly comprising two component elements or parts, first: a pressure sealing element or gasket proper, also designated as a packing element, serving to cooperate with the opposed faces of the joint for sealing the pressure, and second: a gauge element or compression limiting element for limiting the approach of the joint faces toward each other and thus limiting the extent to which the sealing element may be compressed by the faces of the joint.

Such combinations of compression limiting gauges with packing or pressure sealing elements are well known and are most frequently provided when the packing or gasket element is of a type which is likely to be damaged or to have its sealing effectiveness impaired if it is compressed beyond a predetermined extent.

One type of such gasket with which compression limiting gauges have been combined is the type known as spiralwound gasket formed of spirally wound alternate metal strips and packing material strips, the metal strips being formed with a peripheral bead which imparts axial resilience to the gasket or packing element. In a gasket of this type an over compression not only destroys the resilience but otherwise distorts the gasket and impairs the sealing effectiveness of the gasket.

When such compression limiting gauges are combined with pressure sealing gaskets it is desirable to connect or lock the gauge element and the gasket element together in some manner so that the two elements may be handled as a unit in shipping, storing and installing. In gasket constructions of this type heretofore used, various types of means have been used for locking the gasket elements and the gauges together, some of which means have been permanent and others of which have been adapted to be manually assembled and disconnected.

This invention relates to the latter class of constructions.

Previous constructions of this latter class have frequently required that the gauge elements be formed of multiple parts. Such multiple part gauges are expensive and difficult to assemble.

In other cases where single piece or so-called solid gauge elements have been used, the interengaging peripheries of the packing elements and of the gauge elements have required close sizing, and even then the means for locking the packing elements and the gauges together have been uncertain and the packing and gauge elements have frequently become accidentally and inadvertently disconnected and separated.

In a composite sealing and gauge gasket of the type referred to, it is desirable for the sake of simplicity and economy, to use for the compression limiting gauge, a one piece element and for the sake of insurance against separation, to provide a means for locking the sealing element to the gauge which is positive. Inasmuch as different conditions make it advisable to combine different thicknesses of gauges with various thicknesses of gaskets it is further desirable to provide a locking means which can be readily and quickly manipulated to lock together or disconnect the gauge and gasket. It is also desirable for the purpose of preventing any interference by the gauge with the seating of and with the sealing function of the gasket, to make the interlocking means adjustable so as to provide for a variable amount of loose play between the gauge and the gasket.

It is accordingly a prime object of this invention to provide means for interlocking a pressure sealing gasket or packing element with a compression limiting gauge, which is positive and which will not permit the gasket and gauge to become inadvertently or accidentally separated in shipping, handling or installing in the piping.

It is a further object of this invention to provide means for interlocking the gasket with the gauge which can be easily and quickly effected manually by the use of ordinary simple hand tools, and in which the interlocking means can be readily manipulated to disconnect the gasket and the gauge, also by simple hand tools.

It is a further object of this invention to provide, for interlocking a gasket and gauge, a pliable non-resilient interlocking means which comprises a bendable portion which can readily be bent by means of hand tools to effect the interlocking and which will permanently remain fixed in the bent interlocked position until manually returned to a non-interlocking position.

It is a further object of this invention to provide an interlocking means, for a gasket and gauge, in which any desired degree of loose play between the gasket and the gauge can be provided either at the time of original assembling or subsequently.

It is a further object of this invention to provide an interlocking means for a packing ring and gauge which can be adjusted to positively position the packing ring and gauge concentric with each other or eccentric with reference to each other to any degree of eccentricity within the range of the adjustment.

It is a further object of this invention to provide an interlocking means which will not necessitate a close fit between the engaging peripheries of the gauge and gasket.

It is a further object of this invention to incorporate the interlocking means with the packing component in such manner that a gauge component of extremely simple and standard construction can be interlocked with the packing component.

Further and more specific objects of this invention will become apparent from the following description and claims.

Referring to the drawing:

Fig. 1 is a plan view of one form of this improved composite gasket comprising a spirally wound pressure sealing or packing component and compression limiting gauge component in which the sealing component and the gauge components are illustrated partly interlocked with each other by means of improved interlocks consisting of tongues provided on the periphery of the sealing component.

Fig. 2 is an axial section of a pipe joint adapted to be sealed by a composite gasket of the type illustrated in Fig. 1, this gasket being interposed between flanges attached to adjacent ends of two alined pipes, the sectional view of the gasket in this figure being taken on the plane indicated by line 2, 2, in Fig. 1.

Fig. 3 is an enlarged fragmentary plan view of a portion of Fig. 1, this figure illustrating one of the interlocking means provided on the periphery of the sealing component and showing this interlocking means prior to its manipulation into interlocking position with the gauge.

Fig. 4 is a transverse fragmentary sectional view taken on the plane indicated by line 4, 4, in Fig. 3.

Fig. 5 is another enlarged view of a portion of Fig. 1, similar to Fig. 3 but showing the interlocking means provided on the periphery of the sealing component, after its manipulation into a position in which the sealing component and gauge are interlocked.

Fig. 6 is a fragmentary transverse view taken on the plane indicated by line 6, 6, in Fig. 5.

Fig. 7 is a fragmentary view similar to Fig. 5 illustrating a slightly different type of construction embodying this invention.

Fig. 8 is a fragmentary transverse section taken on the plane indicated by line 8, 8 in Fig. 7.

In the following specification and claims the term "axial" when used with reference to portions of the composite gasket, is intended to indicate a direction parallel to, or in the direction of a line passing thru the center of the gasket at right angles to the plane of the gasket, which may be termed the axial center line of the gasket. Likewise, the term "radial" is intended to indicate a direction transverse to the axial center line of the gasket, that is in a direction radial with respect to the center of the gasket. The terms "outwardly" or "inwardly" are intended to indicate directions respectively away from or toward the center of the gasket.

Referring first to the form of this invention illustrated in Figures 1 to 6, inclusive, this improved composite gasket is indicated in its entirety at 1 and consists of two differently constituted components, first: a relatively compressible sealing component or packing component or gasket proper indicated at 2 and second: a relatively rigid incompressible component or gauge element indicated at 3. Both of these components, in the embodiment illustrated, are substantially flat annular elements, the sealing component 2 being substantially concentric with and disposed within the incompressible component 3.

The packing component or ring 2 preferably consists of spirally wound alternate strips of metal and strips of packing material, the convolutions of metal being indicated at 4 and the convolutions of packing material being indicated at 5. The metal strip is formed intermediate its edges with a preferably centrally disposed corrugation forming an outwardly projecting bead positioned intermediate two substantially straight portions.

As will appear, both at the outer periphery 6 and at the inner periphery 7 of the packing component 2, the metal strip continues beyond the packing strip and is wound upon itself for several turns as shown at 4a and 4b, respectively, the terminal convolutions being secured together by spot welding as indicated at 8 or in any other desired manner.

The corrugation in the outer terminal convolutions of the strip metal forms a continuous outwardly projecting bead or ridge 9 running entirely around the perimeter of the packing component between two substantially cylindrical wall portions or zones 10, 10. The width of the outwardly projecting bead is preferably about one-third of the total thickness of the gasket and the sides of the bead preferably converge outwardly.

The superimposed terminal convolutions of metal strip are provided to strengthen the inner and outer peripheries of the sealing component and to prevent the unwinding of this component in handling and service and particularly to rigidly maintain the central bead conformation 9 on the outer perimeter of the sealing component.

In the intermediate area of the packing component 2 formed by alternate strips of metal 4 and packing 5, the packing runs from face to face of the packing ring and is effectively interlocked in the internested corrugations of the strip metal as will clearly appear from Figures 4 and 6. In the completed packing ring the width of the strip metal is preferably slightly less but substantially equal to the width of the packing material and to the overall thickness of the gasket. The corrugation or bead in the metal strip and the yielding nature of the packing material produces a resilience in the packing component which causes it to return to or toward its original thickness providing the packing component has not been compressed beyond a predetermined permissible extent.

The rigid incompressible component or gauge 3 consists of a relatively flat preferably metallic member somewhat less in thickness, in an axial direction, than the packing component 2. This gauge is formed, in the embodiment illustrated, with an outer periphery 11 which is substantially cylindrical and with an inner periphery 12 formed with a groove 13 disposed substantially in the median plane of the gauge and interposed between two flanges or lands 14, 14. The width of the grooves 13, in an axial direction, is preferably wider than the greatest width of the bead 9.

It will appear that this bead or ridge 9 on the outer periphery of the packing component 2 and the groove 13 and flanges 14 on the inner periphery of the packing component 3 constitute juxtaposed complementary tongue and groove conformations when these components are positioned, one within the other in substantially the same plane.

It is also to be noted that the outer periphery defined by the bead or ridge 9 on the packing component is substantially equal to, but preferably slightly smaller than, the inner periphery 12 on the gauge as defined by the inner edges of the flanges or lands 14, leaving a relatively small clearance, as indicated at 15 in Fig. 4, between the juxtaposed peripheries when the two components are concentric one with the other.

At a plurality of positions around the outer periphery of the packing component or gasket, a plurality of incisions 16, three in the embodiment disclosed in Figures 1 to 6, are formed in the outer convolution of the metal strip. These incisions extend transversely thru the bead of the metal strip, that is in a direction parallel to the axis of the gasket. These incisions are preferably formed in the beaded metal strip before the strip is wound upon and attached to the next adjacent convolution of metal strip. This incision consists of a portion 17 (Figures 3 and 5) just outwardly of the wall portions 10, 10 and generally parallel to the periphery at the point of incision and a second portion 18 continuous with the portion 17 and extending radially outwardly thru the outer periphery of the bead. The conformation of the incision as originally formed and prior to certain subsequent manipulations, is best shown at the lower portion of Fig. 1 and in enlarged detail in Figures 3 and 4. This incision forms a tongue 20 defined on its inner side by the incision 17 and on the outer side by the bead 9 and at its free end by the terminating portion 18 of the incision, this tongue being anchored at 19 to the strip metal convolution of which it is formed, and is provided with two outwardly converging side wall portions 21, 21, as best appears in Fig. 4.

The nature of the material of which the metal strip and tongue 20 is made is such that it is sufficiently pliable to permit the tongues to be bent away from the body of the gasket into the positions of the tongues which are shown at 20a in the upper portion of Fig. 1 and also in Figures 5 and 6. This bending of the tongue 20 can readily be effected by inserting, into the incision 16, a hand tool such as a pocket knife, small screw driver or the like. The nature of the metal of which the tongues are formed is such that they are not flexible or resilient but remain fixed in the positions into which they are manually adjusted.

In assembling the packing component with the gauge component the packing component is inserted within the gauge component preferably while all of the tongues are in the position indicated at 20 and the bead or ridge 9 together with the tongues are substantially alined with the groove 13. A sharp tool is then inserted successively into the incisions 16 and the tongues are successively wedged outwardly until the terminal of the tongue extends into the groove 13 of the gauge 3 between the lands or flanges 14. A relative axial movement between the tongue 20 and the gauge 3 causes the flanges 14 to engage one or the other of the side wall portions 21 of the tongue 20 and, as will clearly appear from Figures 1, 5, and 6, the packing component 2 and the gauge component 3 are axially interlocked so that these parts cannot become accidentally or inadvertently separated in handling or installing.

A composite gasket such as that described and assembled above is ready for storage, shipping or for installation, and the rigid gauge ring associated concentrically with the packing ring serves to protect the packing ring against distortion or other injury until safely seated in the joint.

While many services for composite gaskets of this type will occur to those skilled in this art, one application of the gasket is illustrated in Fig. 2, in which the gasket is used to seal a joint between the opposed flat faces of a pair of companion flanges. In this figure two alined pipe sections, assumed to be conveying fluid under pressure, are indicated at 22 and 23. Having threaded connection with the pipe sections 22 and 23 are companion flanges 24 and 25 each formed with a plurality of bolt holes adapted to receive bolts 26. These bolts serve as a means for forcing the flange faces toward each other.

Interposed between the faces of the flanges 24 and 25 is a composite gasket 1, such as that illustrated in Figures 1 to 6, in which the packing component 2 is interlocked with the gauge component 3. Fig. 2 illustrates the packing component in its normal uncompressed condition in engagement with the faces of the flanges and prior to the application of any substantial pressure by the flange bolts.

In practice, the flanges are drawn together into engagement with the faces of the packing component of the interposed composite gasket by successively tightening the bolts in the flanges until the seal is effected or until the engagement of the compression limiting gauge by the flange faces is indicated by the solid resistance which prevents a further normal advancing of the flanges.

As a result of this tightening action, the clearance between the flange faces and the gauge is reduced from that shown in Fig. 2 and, in many instances, may be entirely eliminated in the event that the flanges have been advanced toward each other until their further advance is limited by the gauge. This clearance, however, is so proportioned with respect to the thickness of the gasket that the compression of the gasket to the thickness of the gauge will be ample to insure fluid tightness and that the flanges, being limited by the gauge, cannot impose a degree of compression upon the gasket which will be sufficient to overcompress or materially injure the sealing effectiveness of the gasket.

It is to be noted that the clearance 15 between the juxtaposed peripheries of the packing and gauge components in the composite gasket, is not critical and the engaging peripheries on the gauge and packing component need not be accurately sized with respect to each other. It is only necessary that the packing component be small enough to be readily insertable within the gauge component without unduly distorting the packing component and that the outer periphery of the packing component be not so small as to be beyond the range to which the tongue 20 can be bent. The wide range of allowable clearance 15 afforded by this invention is especially advantageous due to the difficulty of holding the outer perimeter of spirally wound packing components accurately to size in production.

It is also to be noted that the extent to which the tongues 20 are bent toward the outer wall of the groove 13 of the compression limiting gauge 3 is under complete control of the mechanic who is assembling the components 2 and 3 and accordingly the packing component may be tightly held by the terminals of the tongues 20 against radial motion or, on the other hand, a wide range of radial loose play may be permitted between the components, while still maintaining an effective axial interlock between the components. In practice a slight radial loose play is desirable in order that the packing element may assume its most effective sealing position without any interference by the gauge. Simultaneously with the radial loose play an axial loose play between the packing and gauge components is provided for, by the excess in width of the space between the flanges 14, 14 and the sides 21, 21 of the tongue.

It is also to be noted that these bendable interlocking tongues make it possible to positively control the centering of the packing component with reference to the gauge component, that is, to make the components concentric with each other or eccentric with respect to each other to different extents, as may be required by conditions. This variation in eccentricity can be effected, as will be understood, by bending the several tongues 20 to varying extents.

As pointed out, the packing component 2 and the gauge component 3 cannot inadvertently fall apart or be shaken apart, and these parts can only be separated if and when the tongues 20 are again bent toward the packing component until the outer points on the tongues are again alined with, or substantially alined with, the original outer periphery of the packing component. If it should become necessary to replace a compression limiting gauge or a packing element of a composite gasket, either because a different combination is required to meet different conditions or because the packing element needs to be renewed, the tongues 20 can readily be bent back into their original position by means of a sharp flat tool.

In view of the circumstances that different conditions make advisable different degrees of compression and that different diameters of gauges are required for centering on different bolt circles of flanges, it becomes necessary to make provision to associate any one of several gauges with each compressible packing component and vice versa and the hereinbefore described quickly bendable interlocking means makes possible the rapid and positive connecting and the rapid detaching of the one component from the other.

In the form of the invention described above the bendable tongue 20 is anchored to and is formed integrally from the outermost convolutions 4a of the metal strip 4, which is a part of the gasket structure and which constitutes in fact the outer periphery of the completed gasket. Other methods of providing these interlocking tongues on the outer periphery of the gasket can be devised and one of these alternate forms is illustrated in Figures 7 and 8.

In these figures, 3 indicates the relatively incompressible gauge component which may be substantially identical with the gauge component 3 previously described. The compressible packing component or gasket proper of this alternate form is indicated at 30 and may be assumed to be substantially identical in construction with the packing component 2 previously described. The packing component 30 differs, however, from the component 2 in the respect that the beaded outer convolution 31 of the metal strip, which is secured to the next inner adjacent convolution by welding, is continuous and free from interruptions, that is, the outer convolution 31 is not formed with any incisions or tongues. Tongues corresponding to the tongues 20 are provided in a plurality of separate spaced pads, as many as may be desired, each secured by welding to the peripheral convolution 31 of the standard finished gasket.

These separate pads, indicated at 32, may be of any suitable conformation and may be made of any suitable material but they are preferably substantially identical in conformation, gauge, and material with the metal strip which is used in the body and in the peripheral convolutions of the gasket. These separate pads 32 are preferably bent to approximately the same curvature as the periphery of the gasket and include an outwardly converging corrugation or bead 33 and two lateral straight flange portions 34, 34. This strip is formed, preferably before its application to the gasket 30, with an incision 35 extending thru both sides of the bead 33. This incision consists of a portion 36 positioned just outwardly of the flange portions 34, 34 and generally parallel to the flange portions and a second portion 37 continuous with the portion 36 and extending radially outwardly thru the crest of the bead 33. This incision forms a tongue 38 anchored at and bendable about the point 39 on the pad 32. The pad 32 is formed as pointed out above and is nested over the periphery of the gasket 30, the flanges 34 engaging the wall portions 10 and the bead 33 on the separate strip fitting over the bead 9 of the gasket. The separate strip is secured to the outer peripheral convolution 31 of the gasket 30 by a series of spot welds indicated at 40, or in any other desired manner. Such pads 32 are successively attached to the periphery of the gasket until the gasket has been provided with the number of tongues 38 required, to properly adapt the gasket for interlocking with the gauge.

When the separate pads are being attached to the gasket, the tongues 38 are preferably alined with the adjacent portions of the bead 33 and when the tongues are in this position the gasket may readily be inserted within the gauge component. After the gasket and gauge are properly positioned, a sharp tool may be inserted successively into the incisions 35 to successively wedge the tongues 38 outwardly until the terminals of the tongues extend into the grooves 13 between the lands or flanges 14 on the gauge component 3, as appears in Figures 7 and 8. These tongues can be adjusted in a radial direction and serve to axially interlock the packing component and gauge component in identically the same manner as described with reference to the form of the invention illustrated in Figures 1 to 6.

This modified form just described has the advantage that the strength and continuity of the outer convolution of the metal strip of the gasket proper is not impaired and that tongues may be added to the outer periphery of the gasket in any number and in any position, even after the gasket proper has been completed.

It will be evident that this invention, in its broader concepts, is not limited to an arrangement in which the packing component is disposed interiorly of the gauge component, as tongues con readily be provided on the interior periphery of the gasket to interlock with suitable complementary conformations on the outer periphery of the gauge when such a relative arrangement of gasket and gauge is necessary.

It will also be apparent that this invention can be applied to a gasket which does not include a bead in the conformation of its peripheral convolution of metal. The tongues may readily be formed in flat strip metal.

It is also noted that the packing element and the gauge are each shown annular in conformation. As is well known, these pieces need not necessarily be round and are regularly made in oval, elliptical, or other irregular shapes and may assume any conformation which may be necessary or convenient to suit the conformation of the areas to be sealed.

It will also be clear that the form of this invention described with reference to Figures 7 and 8 is not limited to a construction in which the tongue 38 is formed intermediate the ends of the pad 32. This tongue may readily be formed at one end of and project beyond the body of the pad as will readily be understood.

Many other modifications of this invention and its application in addition to those shown, will naturally occur to those skilled in this art and the present disclosures should therefore be considered as typical only and applicant desires not to be limited to the exact constructions shown and described.

What I claim is:

1. A gasket element formed of alternate spirally wound strips of metal and packing material, the outer and inner peripheries of the gasket element being formed of convolutions of metal strip secured to the respective adjacent convolutions of metal strip, a plurality of manually bendable inelastic metal tongues provided on one of the said peripheral metal convolutions, said tongues being normally disposed substantially parallel to the adjacent portion of the periphery and adapted to be bent radially away from the body of the gasket element forming inelastic bendable projections extending beyond the periphery of the gasket element and adapted to position a compression limiting element.

2. A gasket element formed of spirally wound alternate strips of metal and packing material, the outer periphery of the gasket element being formed of a plurality of convolutions of metal strip superimposed upon each other and secured together, a plurality of manually bendable inelastic metal tongues provided on the said outer periphery substantially alined with the adjacent portion of the periphery and adapted to be bent in a direction radially outwardly from the periphery forming inelastic fixed projections extending beyond the periphery of the gasket element and adapted to position a compression limiting element.

3. A gasket element formed of spirally wound alternate strips of metal and packing material, said metal strips being formed with an outwardly projecting bead in the median plane of the gasket element, the outer periphery of the gasket element being formed of a plurality of convolutions of metal strip superimposed upon each other and secured together, a plurality of bendable tongues cut from the outer of said convolutions and including a portion of said bead, said tongues being adapted to be bent in a direction away from the outer periphery of the gasket element and adapted to position a compression limiting element.

4. A gasket element formed of spirally wound alternate strips of metal and packing material, said metal strip being formed with an outwardly projecting bead in the median plane of the gasket element, said metal strips overlapping and being secured to adjacent convolutions of the metal strips at the outer periphery of the gasket element and a plurality of spaced incisions formed in the peripheral bead at least a portion of the incisions being substantially parallel to the adjacent portion of the periphery, forming manually bendable inelastic tongues adapted to be bent away from the periphery of the gasket element to form fixed projections extending beyond the periphery of the gasket element and adapted to position a compression limiting element.

5. A gasket element formed of spirally wound alternate strips of metal and packing material, the outer periphery of the gasket element being formed of a plurality of convolutions of metal strip superimposed upon each other and secured together, a plurality of peripherally elongated pads secured in spaced relation to the said outer periphery, said pads being formed with a relatively inelastic tongue normally substantially parallel to the periphery and adapted to be manually bent in a direction radially outwardly from the periphery of the gasket element and adapted to position a compression limiting element.

6. A gasket element formed of spirally wound alternate strips of metal and packing material, said metal strip being formed with an outwardly projecting bead in the median plane of the gasket element, the outer periphery of the gasket element being formed of a plurality of convolutions of metal strip superimposed upon each other and secured together and forming a peripheral bead, a plurality of elongated pads separately formed of said beaded strip metal and secured to the periphery in spaced relation, the bead of the pad being nested on the bead on the periphery of said pad being provided intermediate its ends with a bendable tongue formed from a portion of said bead normally substantially parallel to the periphery and adapted to be bent in a direction radially outwardly from the periphery and adapted to position a compression limiting element.

7. A composite gasket comprising a pressure sealing component and a compression limiting component, disposed one within the other, the sealing component being formed of spirally wound alternate strips of metal and packing material and having one periphery formed of a plurality of convolutions of metal strip secured together, and the compression limiting component consisting of a substantially flat relatively incompressible element formed with a groove on that periphery juxtaposed to the said one periphery, a plurality of relatively inelastic manually bendable tongues integrally formed with the said convolutions and adapted to be manually bent in a direction radially away from the said convolutions to a position intersecting the groove in the compression limiting component.

8. A composite gasket comprising a pressure sealing component and a compression limiting component, disposed one within the other, the sealing component being formed of spirally wound alternate strips of metal and packing material and having one periphery formed of a plurality of convolutions of metal strip secured together, and the compression limiting component consisting of a substantially flat relatively incompressible element formed with a groove on that perimeter juxtaposed to the said periphery, a plurality of elongated pads secured, in spaced relation, to said periphery, said pads each being formed with a relatively pliable elongated tongue normally substantially parallel to the periphery and adapted to be manually bent in a direction radially away from the said periphery to a position intersecting the groove in the compression limiting component, whereby the sealing component and compression limiting component become axially interlocked.

9. A composite gasket comprising a pressure sealing component and a compression limiting component disposed one within the other, the sealing component being formed of spirally wound alternate strips of packing material and metal, the metal strips being formed with a radially extending bead in the median plane of the sealing component projecting in a direction toward the compression limiting component and the peripheries of the sealing component being formed of a plurality of convolutions of the metal strip secured together, the compression limiting component consisting of a relatively incompressible element formed with a groove on the periphery opposed to the sealing component, and a plurality of spaced incisions formed thru the peripheral bead at the periphery of the sealing component forming peripherally elongated manually bendable tongues including a portion of the bead and adapted to be bent away from the periphery to a position intersecting the groove in the compression limiting component.

10. A composite gasket comprising in combination a pressure sealing packing component and a compression limiting component, the packing component being disposed interiorly of the compression limiting component, said packing component being formed of alternate strips of spirally wound metal and packing material, said metal strips being formed with an outwardly projecting bead in the median plane of the gasket and overlapping and being secured to adjacent convolutions of the metal strips at the outer periphery of the gasket, said compression limiting component comprising a substantially flat relatively incompressible element formed with a groove on its inner periphery, and a plurality of bendable relatively inelastic tongues provided on the outer periphery of the packing component adapted, when bent outwardly, to enter the groove of the compression limiting component whereby the two components are axially interlocked.

KENNETH McCREARY.